US012523484B2

(12) United States Patent
Reed

(10) Patent No.: US 12,523,484 B2
(45) Date of Patent: Jan. 13, 2026

(54) SYSTEMS AND METHODS FOR GENERATING AUTONOMOUS NAVIGATION ROUTES TO MATCH USER PREFERENCES

(71) Applicant: Toyota Motor Engineering & Manufacturing North America, Inc., Plano, TX (US)

(72) Inventor: Frankie Reed, Ypsilanti, MI (US)

(73) Assignee: Toyota Motor Engineering & Manufacturing Norther America, Inc., Plano, TX (US)

( * ) Notice: Subject to any disclaimer, the term of this patent is extended or adjusted under 35 U.S.C. 154(b) by 421 days.

(21) Appl. No.: 16/826,345

(22) Filed: Mar. 23, 2020

(65) Prior Publication Data

US 2021/0293565 A1    Sep. 23, 2021

(51) Int. Cl.
*G01C 21/36* (2006.01)
*B60W 60/00* (2020.01)
*G01C 21/34* (2006.01)

(52) U.S. Cl.
CPC ... *G01C 21/3617* (2013.01); *B60W 60/00253* (2020.02); *G01C 21/3438* (2013.01); *G01C 21/3461* (2013.01); *G01C 21/3484* (2013.01)

(58) Field of Classification Search
CPC .... G01C 21/34; G01C 21/32; G01C 21/3617; G01C 21/3438; G01C 21/3461; G01C 21/3484; G06K 9/00; G05D 1/00; G05D 1/02; G06Q 10/06; G06Q 30/06; G06Q 50/12; G06Q 50/30; G06Q 50/00; G07C 5/00; B60W 50/08; B60W 60/00253; G06N 99/00; B62D 1/00; B62D 15/02; G08G 1/16; G08G 1/0962

See application file for complete search history.

(56) References Cited

U.S. PATENT DOCUMENTS

| | | | |
|---|---|---|---|
| 9,623,905 B2 | 4/2017 | Shashua et al. | |
| 10,943,255 B1* | 3/2021 | Andreou | G06Q 30/0244 |
| 10,956,981 B1* | 3/2021 | Fields | G06T 19/006 |
| 2011/0214047 A1* | 9/2011 | Pilskalns | G06F 16/29 |
| | | | 715/205 |
| 2012/0203572 A1* | 8/2012 | Christensen | G06Q 30/02 |
| | | | 705/2 |
| 2013/0046823 A1* | 2/2013 | Mitchell | G06Q 30/0201 |
| | | | 709/204 |
| 2013/0210493 A1* | 8/2013 | Tal | H04L 67/10 |
| | | | 455/566 |
| 2013/0222387 A1* | 8/2013 | Bradshaw | G06T 11/206 |
| | | | 345/440 |
| 2013/0278631 A1* | 10/2013 | Border | G06Q 30/02 |
| | | | 345/633 |
| 2014/0074629 A1* | 3/2014 | Rathod | G06Q 10/10 |
| | | | 705/14.73 |

(Continued)

*Primary Examiner* — Scott A Browne
*Assistant Examiner* — Terry C Buse
(74) *Attorney, Agent, or Firm* — Dinsmore & Shohl LLP

(57) ABSTRACT

Systems and methods for generating autonomous navigation routes to match user preferences include an autonomous vehicle and a routing system configured to (i) generate a unique route to satisfy driving past at least one user event request to navigate the autonomous vehicle arrive at a destination and (ii) navigate the autonomous vehicle to the destination along the unique route tailored to meet the at least one user event request.

17 Claims, 3 Drawing Sheets

(56) References Cited

U.S. PATENT DOCUMENTS

| | | |
|---|---|---|
| 2014/0108307 A1 | 4/2014 | Raghunathan et al. |
| 2014/0129942 A1* | 5/2014 | Rathod .................. G06Q 50/01 715/720 |
| 2014/0250128 A1* | 9/2014 | Akin ....................... G06T 7/194 707/740 |
| 2015/0121216 A1* | 4/2015 | Brown .................. G06N 3/008 715/705 |
| 2015/0371265 A1* | 12/2015 | Leisher ............. G06Q 30/0261 705/14.55 |
| 2016/0063550 A1* | 3/2016 | Caldwell ............ G06Q 30/0269 705/14.53 |
| 2016/0088031 A1* | 3/2016 | Kumar ................. H04L 65/403 709/204 |
| 2016/0111007 A1* | 4/2016 | Dennerline ............. G06F 16/23 701/528 |
| 2016/0125743 A1* | 5/2016 | Shorter, Jr. ............. G06F 3/048 701/528 |
| 2016/0240010 A1* | 8/2016 | Rosenthal ............. G06V 20/30 |
| 2016/0241672 A1* | 8/2016 | Fried ....................... H04L 51/56 |
| 2016/0255139 A1* | 9/2016 | Rathod .................. H04L 67/42 709/203 |
| 2017/0031735 A1* | 2/2017 | Levien .................. G06F 21/554 |
| 2017/0083962 A1* | 3/2017 | Agarwal ............ G06Q 30/0631 |
| 2017/0124540 A1* | 5/2017 | Chan ..................... G06Q 20/204 |
| 2017/0161281 A1* | 6/2017 | Bhartia ................. H04W 4/029 |
| 2017/0328725 A1* | 11/2017 | Schlesinger ........ G01C 21/3438 |
| 2017/0331805 A1* | 11/2017 | Pham ................. G06Q 30/0271 |
| 2017/0349184 A1 | 12/2017 | Tzirkelhancock et al. |
| 2018/0095636 A1* | 4/2018 | Valdivia ................. G06F 3/012 |
| 2018/0165645 A1* | 6/2018 | Magpayo ................ H04L 51/10 |
| 2018/0204111 A1* | 7/2018 | Zadeh .................. G06N 3/0436 |
| 2018/0308133 A1* | 10/2018 | Geist, Jr. ............ G06Q 30/0271 |
| 2018/0350144 A1* | 12/2018 | Rathod .................... G06T 13/40 |
| 2019/0012625 A1 | 1/2019 | Lawrenson et al. |
| 2019/0075340 A1* | 3/2019 | Hochart ................. H04L 51/02 |
| 2019/0144000 A1* | 5/2019 | Hennes .................. G06F 16/29 701/23 |
| 2019/0162549 A1 | 5/2019 | Fouad et al. |
| 2020/0051103 A1* | 2/2020 | Chiu .................. G06Q 30/0209 |
| 2020/0264629 A1* | 8/2020 | Maveddat ............ G05D 1/0276 |
| 2020/0366873 A1* | 11/2020 | Hong ................. H04N 5/23238 |
| 2021/0025715 A1* | 1/2021 | Benjamin ............. G06Q 50/40 |
| 2021/0264502 A1* | 8/2021 | Mozafarian ........ G06Q 30/0635 |
| 2021/0293565 A1* | 9/2021 | Reed .................. G01C 21/3461 |

* cited by examiner

SYSTEMS AND METHODS FOR GENERATING AUTONOMOUS NAVIGATION ROUTES TO MATCH USER PREFERENCES

TECHNICAL FIELD

The present specification generally relates to autonomous navigation routes and, more specifically, to systems and methods for generating autonomous navigation routes to match user preferences.

BACKGROUND

Autonomous vehicles may employ technology to either (i) select a navigation route for a user or (ii) allow a user to select one of multiple available navigation routes. Such navigation routes may be selected based on estimated time of arrival, tolls, and the like. However, a user may desire an autonomous vehicle technology to automatically generate a navigation route to match user preferences. The user may desire selection of a route acceptable to the user that is generated based on user preferences and not selected based on factors that do not consider user preferences.

SUMMARY

In one embodiment, a routing system may include one or more processors, a memory communicatively coupled to the one or more processors, and machine readable instructions stored in the memory. The machine readable instructions cause the routing system to perform at least the following when executed by the one or more processors: receive a destination, receive at least one user event request, generate a unique route to satisfy driving past the at least one user event request to navigate an autonomous vehicle arrive at the destination, and navigate the autonomous vehicle to the destination along the unique route tailored to meet the at least one user event request.

In another embodiment, a method for generating autonomous navigation routes may include receiving at a routing system a destination for an autonomous vehicle, receiving at least one user event request, generating, via the routing system, a unique route to satisfy driving past the at least one user event request to navigate the autonomous vehicle arrive at the destination, and navigating the autonomous vehicle to the destination along the unique route tailored to meet the at least one user event request.

In one other embodiment, an autonomous vehicle may include a routing system communicatively coupled to the autonomous vehicle, one or more processors, a memory communicatively coupled to the one or more processors, and machine readable instructions stored in the memory. The machine readable instructions cause the autonomous vehicle to perform at least the following when executed by the one or more processors: receive, via the routing system, a destination, receive, via the routing system, at least one user event request, generate a unique route to satisfy driving past the at least one user event request to navigate the autonomous vehicle arrive at the destination, and navigate to the destination along the unique route tailored to meet the at least one user event request.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein are directed to providing users with preferential routes when a vehicle is in autonomous mode. Users may inform autonomous vehicles of certain navigation route characteristics or experiences they wish to experience such that the autonomous vehicle formulates a navigation route to match those user input route characteristics or experiences. Thus, autonomous vehicles may, through a routing system, generate unique routes to satisfy user preferences or instructions and provide the user with a route tailored to meet events the user wishes to experience. Various autonomous navigation methods and systems will be described in more detail herein with specific reference to the corresponding drawings.

Figure 1:
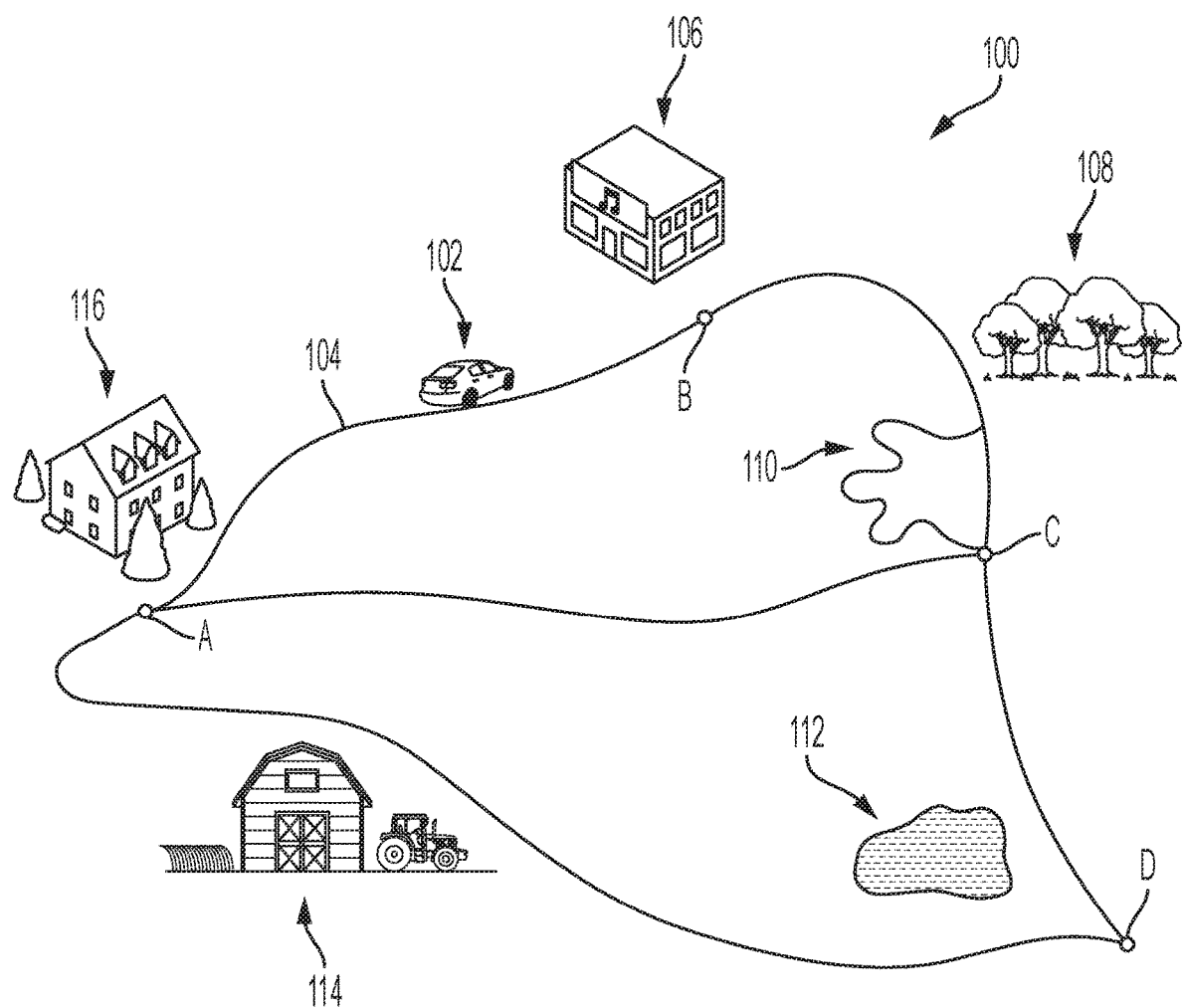
FIG. 1 schematically depicts a variety of routes for an autonomous vehicle, according to one or more embodiments shown and described herein.

Referring to FIG. 1, a variety of routes 100 for an autonomous vehicle 102 is shown. A navigation route 104 of the variety of routes 100 may be disposed between one or more points A, B, C, and D. The navigation route 104 may pass by areas of interest, such as a retail store 106, a park 108, a winding road 110, a water area 112, rural areas 114, and residences 116. The retail store may be a music store, a shopping complex, a restaurant, or the like. The park 108 may include local parks, national parks, a forested area, or the like. The water area 112 may be one or more of lakes, rivers, streams, and the like. The rural areas 114 may include farmhouses, fields, pastures, countryside, or the like.

A user may instruct an autonomous vehicle 102 to tailor the navigation route 104 to the user's preferences. For instance, the user may instruct the vehicle of certain events the user wishes to experience. The user may want to see certain retail stores 106 such as stores, shops, or restaurants. For instance, the user may inform the vehicle that she wishes to drive past music stores. The autonomous vehicle 102 will then create a navigation route that takes the user past music stores. The user may also instruct the autonomous vehicle 102 that she wishes to take winding roads such as the winding road 110, drive through farmland such as the rural area 114, drive through forests such as the park 108, and the like. The autonomous vehicle 102 will then generate one or more navigation routes 104 that meet the one or more user preferences.

In embodiments, if the user merely wishes to take a scenic drive, the autonomous vehicle may generate a scenic route that eventually terminates back where the user departed from, such as a route starting from point A and ending at point A. In other embodiments, the user may start at point A and wish to reach point C, and the vehicle may generate one or more scenic routes 104 between the two points, for instance. As a non-limiting example, the autonomous vehicle 102 may generate a navigation route 104 from point A to point B to point C that passes the retail store 106 and includes the winding road 110, the autonomous vehicle 102 may generate a navigation route 104 from point A to point B to point C that passes the retail store 106 and does not include the winding road 110, and/or the autonomous vehicle 102 may generate a navigation route 104 from point A to point D to point C that passes the water area 112 and the rural areas 114.

Further, the user may inform the autonomous vehicle 102 of his or her navigation preferences through any suitable user interface, such as a graphical user interface (GUI) of an application tool on a smart mobile device or a GUI within the autonomous vehicle 102. For instance, the user may select certain navigation preferences in a display on a vehicle head unit, instruct the autonomous vehicle 102 of preferences through voice command, and/or instruct the autonomous vehicle 102 through a user's mobile device that is in wireless communication with the vehicle.

Figure 2:
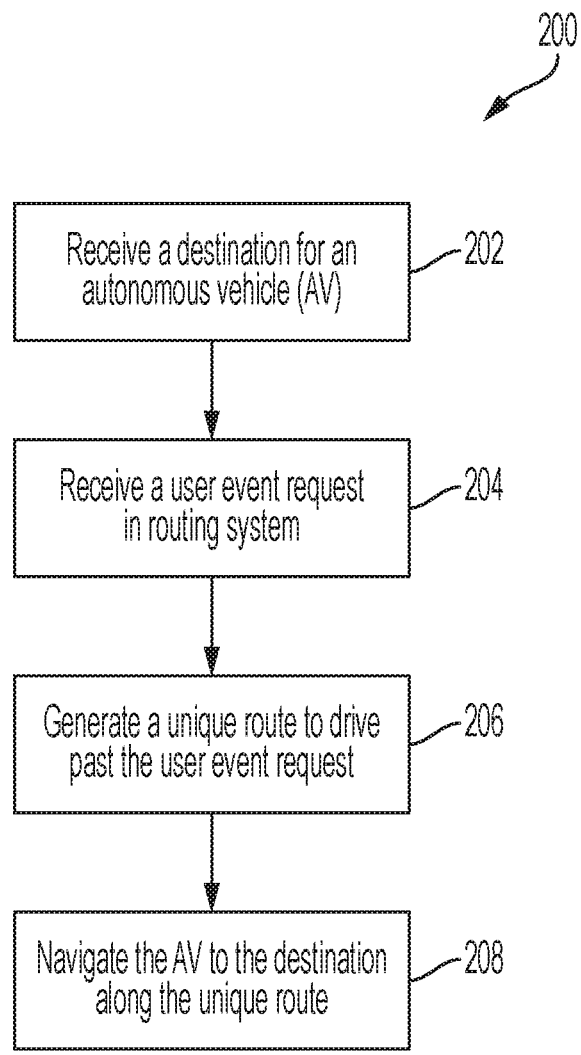
FIG. 2 schematically depicts a flowchart of a method of generating an autonomous navigation route to match user preferences, according to one or more embodiments shown and described herein.

Referring to FIG. 2, a flowchart of a control scheme 200 of generating an autonomous navigation route to match user preferences is shown. In block 202, a destination for an autonomous vehicle 102 is received in a routing system 300, described in greater detail below. The destination may be, for example, one of points A, B, C, or D of FIG. 1 and may be received as an address or other identifying location parameter. In an embodiment, the destination may be a residence 116 or other location in a different state from the user's starting location. The destination may be set to return to a starting location or may be different from the starting location.

In block 204, a user event request is received in the routing system 300. The user event request may be received based on at least a user profile of one or more user profiles. The user profile may include one or more stored preferences, and the at least one user event request may include at least one of the one or more stored preferences. A user profile may be a profile associated with a single user or associated with a multi-person group, such as a family. The user profile may include stored user preferences from which to generate the at least one user event request. Thus, a user profile associated with a single user may include the one or more stored preferences for the single user, and the user profile associated with the multi-person group may include one or more stored preferences for the multi-person group. A user may further input data as an input preference into the user profile such that the user event request is based on the input preference. The preferences associated within a user profile as described herein may be stored preferences, input preferences, or combination thereof.

As a non-limiting embodiment, the user profile may include past unique routes, music preferences, food preferences, and personal data. The personal data may include, for example, a user's social media interaction such as social media profiles. The user event request may be based on a social medial profile of a user, such as a social media picture at a location that the user event request transmits as the location to drive past. The routing system 300 may determine a proximity of the autonomous vehicle 102 to a location stored in the user profile as a user preference and suggest a route modification to the location based on the proximity. Alternatively or additionally, advertisements associated with the location may be submitted to the user based on the proximity of the location. A user may opt to stop at one or more locations along the route and may instruct the routing system 300 to stop at the one or more locations through user feedback to the routing system to modify the navigation route 104.

In block 206, a unique route is generated to drive past the user event request. The routing system 300 may generate one or more navigation routes 104 based on the one or more user profiles and the user event request. The routing system 300 may generate the one or more navigation routes 104 based on predicted user event requests based on the one or more user profiles, such as places previously indicated by the user to be of interest that the routing system 300 determines to be along and/or accessible via the navigation route 104. The routing system 300 may generate one or more modifications or suggestions to a navigation route 104, and the user may opt as feedback to select the one or modifications or suggestions to modify the navigation route 104. In an embodiment, a user may be prompted to select as feedback one of the generated one or more navigation routes 104 prior to the navigation along a selected navigation route 104 commencing by the autonomous vehicle 102. In an embodiment, the control scheme 200 may be applied to a partially autonomous vehicle. In another embodiment, the control scheme 200 may be applied to a vehicle in a manual mode to generate a navigation route 104 based on the user event request to present to the user.

In block 208, the autonomous vehicle 102 is navigated to the destination along the unique route such as the navigation route 104. The routing system 300 may continue to prompt the user with one or more modifications or suggestions to the navigation route 104 that the user may select to modify the navigation route 104 when in route. In embodiment, the autonomous vehicle 102 may further be navigated to a starting location to pick up a user prior to navigating along the navigation route 104 as the unique route to the destination.

The autonomous vehicle 102 and the routing system 300 may thus be configured to (i) generate the unique route to satisfy driving past at least one user event request to navigate the autonomous vehicle 102 arrive at a destination and (ii) navigate the autonomous vehicle 102 to the destination along the unique route tailored to meet the at least one user event request.

Figure 3:
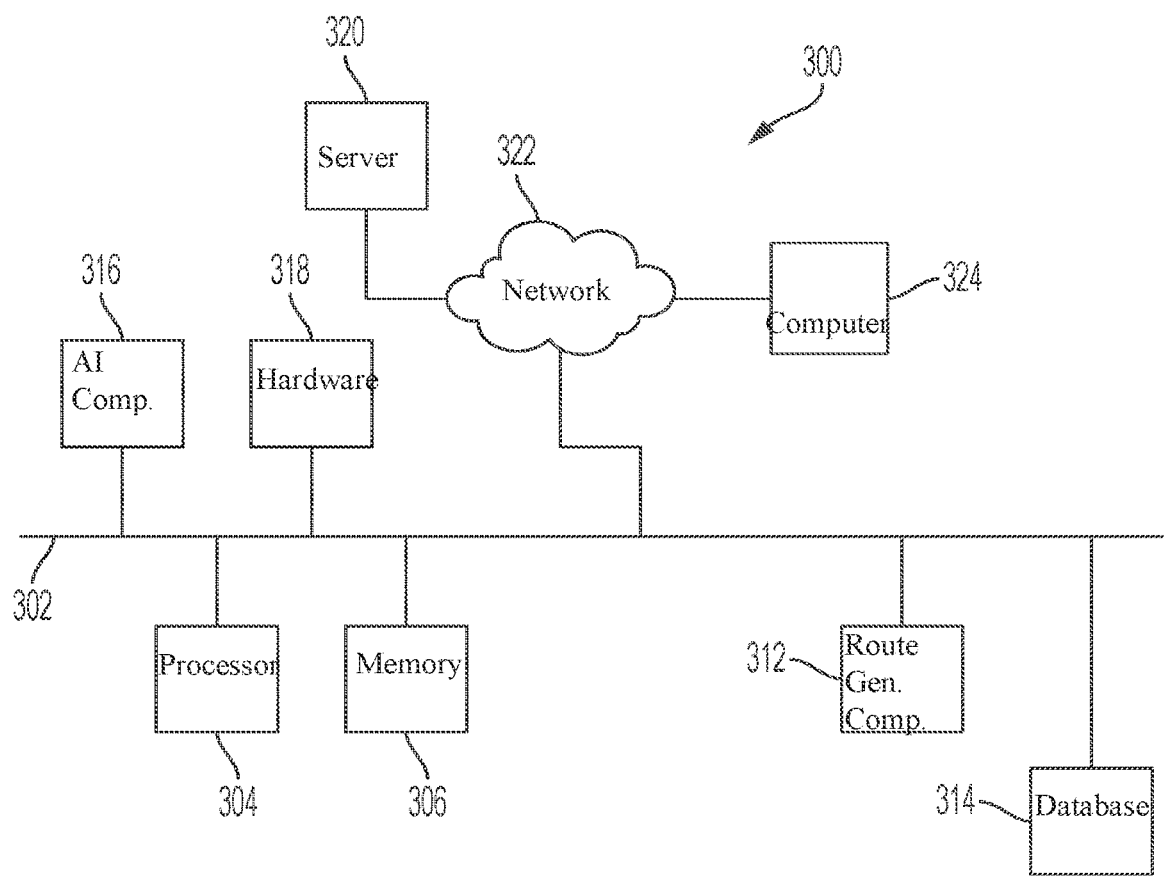
FIG. 3 schematically depicts a system for implementing computer and software based methods to generate autonomous navigation routes to match user preferences, according to one or more embodiments shown and described herein.

Referring to FIG. 3, the routing system 300 for implementing a computer and software-based method to utilize the system devices to generate autonomous navigation routes to match user preferences is illustrated. The routing system 300 may be implemented along with using a graphical user interface (GUI) that is accessible at a user workstation (e.g., a computer 324), for example. The user workstation may be a smart mobile device, which may be a smartphone, a tablet, or a like portable handheld smart device. As a non-limiting example, the smart mobile device may be a smartphone or a tablet. The smart mobile device includes a camera, a processor, a memory communicatively coupled to the processor, and machine readable instructions stored in the memory. The machine readable instructions may cause the routing system 300 to, when executed by the processor, launch and operate a software application tool on the smart mobile device. The machine readable instructions may cause the routing system 300 to, when executed by the processor, use the functionality provided by the software application tool to follow one or more control schemes as set forth in the one or more processes described herein.

The routing system 300 includes machine readable instructions stored in non-transitory memory that cause the routing system 300 to perform one or more of instructions when executed by the one or more processors, as described in greater detail below. The routing system 300 includes a communication path 302, one or more processors 304, a memory component 306, a route generation component 312, a storage or database 314 that may include a product image database, an artificial intelligence component 316, a network interface hardware 318, a server 320, a network 322, and at least one computer 324. The various components of the routing system 300 and the interaction thereof will be described in detail below.

In some embodiments, the routing system 300 is implemented using a wide area network (WAN) or network 322, such as an intranet or the Internet, or other wired or wireless communication network that may include a cloud computing-based network configuration. The computer 324 may include digital systems and other devices permitting connection to and navigation of the network, such as the smart mobile device. Other routing system 300 variations allowing for communication between various geographically diverse components are possible. The lines depicted in FIG. 3 indicate communication rather than physical connections between the various components.

As noted above, the routing system 300 includes the communication path 302. The communication path 302 may be formed from any medium that is capable of transmitting a signal such as, for example, conductive wires, conductive traces, optical waveguides, or the like, or from a combination of mediums capable of transmitting signals. The communication path 302 communicatively couples the various components of the routing system 300. As used herein, the term "communicatively coupled" means that coupled components are capable of exchanging data signals with one another such as, for example, electrical signals via conductive medium, electromagnetic signals via air, optical signals via optical waveguides, and the like.

As noted above, the routing system 300 includes the processor 304. The processor 304 can be any device capable of executing machine readable instructions. Accordingly, the processor 304 may be a controller, an integrated circuit, a microchip, a computer, or any other computing device. The processor 304 is communicatively coupled to the other components of the routing system 300 by the communication path 302. Accordingly, the communication path 302 may communicatively couple any number of processors with one another, and allow the modules coupled to the communication path 302 to operate in a distributed computing environment. Specifically, each of the modules can operate as a node that may send and/or receive data. The processor 304 may process the input signals received from the system modules and/or extract information from such signals.

As noted above, the routing system 300 includes the memory component 306 which is coupled to the communication path 302 and communicatively coupled to the processor 304. The memory component 306 may be a non-transitory computer readable medium or non-transitory computer readable memory and may be configured as a nonvolatile computer readable medium. The memory component 306 may comprise RAM, ROM, flash memories, hard drives, or any device capable of storing machine readable instructions such that the machine readable instructions can be accessed and executed by the processor 304. The machine readable instructions may comprise logic or algorithm(s) written in any programming language such as, for example, machine language that may be directly executed by the processor, or assembly language, object-oriented programming (OOP), scripting languages, microcode, etc., that may be compiled or assembled into machine readable instructions and stored on the memory component 306. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components. In embodiments, the routing system 300 may include the processor 304 communicatively coupled to the memory component 306 that stores instructions that, when executed by the processor 304, cause the processor to perform one or more functions as described herein.

Still referring to FIG. 3, as noted above, the routing system 300 comprises the display such as a GUI on a screen of the computer 324 for providing visual output such as, for example, information, graphical reports, messages, or a combination thereof. The computer 324 may include one or more computing devices across platforms, or may be communicatively coupled to devices across platforms, such as smart mobile devices including smartphones, tablets, laptops, and/or the like. The display on the screen of the computer 324 is coupled to the communication path 302 and communicatively coupled to the processor 304. Accordingly, the communication path 302 communicatively couples the display to other modules of the routing system 300. The display can include any medium capable of transmitting an optical output such as, for example, a cathode ray tube, light emitting diodes, a liquid crystal display, a plasma display, or the like. Additionally, it is noted that the display or the computer 324 can include at least one of the processor 304 and the memory component 306. While the routing system 300 is illustrated as a single, integrated system in FIG. 3, in other embodiments, the systems can be independent systems.

The routing system 300 comprises the route generation component 312 to automate route generation of an autonomous vehicle to match user preferences and the artificial intelligence component 316 to train and provide machine learning capabilities to a neural network to aid with automated route generation as described herein. The route generation component 312 and the artificial intelligence component 316 are coupled to the communication path 302 and communicatively coupled to the processor 304. The processor 304 may process the input signals received from the system modules and/or extract information from such signals.

Data stored and manipulated in the routing system 300 as described herein is utilized by the artificial intelligence component 316, which is able to leverage a cloud computing-based network configuration such as the cloud to apply Machine Learning and Artificial Intelligence. This machine learning application may create models that can be applied by the routing system 300, to make it more efficient and intelligent in execution. As an example and not a limitation, the artificial intelligence component 316 may include components selected from the group consisting of an artificial intelligence engine, Bayesian inference engine, and a decision-making engine, and may have an adaptive learning engine further comprising a deep neural network learning engine.

The routing system 300 includes the network interface hardware 318 for communicatively coupling the routing system 300 with a computer network such as network 322. The network interface hardware 318 is coupled to the communication path 302 such that the communication path 302 communicatively couples the network interface hardware 218 to other modules of the routing system 300. The network interface hardware 318 can be any device capable of transmitting and/or receiving data via a wireless network. Accordingly, the network interface hardware 318 can include a communication transceiver for sending and/or receiving data according to any wireless communication standard. For example, the network interface hardware 318 can include a chipset (e.g., antenna, processors, machine readable instructions, etc.) to communicate over wired and/or wireless computer networks such as, for example, wireless fidelity (Wi-Fi), WiMax, Bluetooth, IrDA, Wireless USB, Z-Wave, ZigBee, or the like.

Still referring to FIG. 3, data from various applications running on computer 324 can be provided from the computer 324 to the routing system 300 via the network interface hardware 318. The computer 324 can be any device having hardware (e.g., chipsets, processors, memory, etc.) for communicatively coupling with the network interface hardware 318 and a network 322. Specifically, the computer 324 can include an input device having an antenna for communicating over one or more of the wireless computer networks described above.

The network 322 can include any wired and/or wireless network such as, for example, wide area networks, metropolitan area networks, the Internet, an Intranet, the cloud 323, satellite networks, or the like. Accordingly, the network 322 can be utilized as a wireless access point by the computer 324 to access one or more servers (e.g., a server 320). The server 320 and any additional servers such as a cloud server generally include processors, memory, and chipset for delivering resources via the network 322. Resources can include providing, for example, processing, storage, software, and information from the server 320 to the routing system 300 via the network 322. Additionally, it is noted that the server 320 and any additional servers can share resources with one another over the network 322 such as, for example, via the wired portion of the network, the wireless portion of the network, or combinations thereof.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A routing system comprising:
   one or more processors;
   a non-transitory memory communicatively coupled to the one or more processors; and
   machine readable instructions stored in the memory that cause the routing system to perform at least the following when executed by the one or more processors:
   determine, via the routing system, a starting location for vehicle navigation;
   receive a destination;
   receive at least one user event request;
   generate a unique route to satisfy driving past the at least one user event request to navigate an autonomous vehicle to arrive at the destination;
   navigate the autonomous vehicle via the routing system to the destination along the unique route tailored to meet the at least one user event request, wherein the at least one user event request comprises a location based on a pre-uploaded social media picture in a social media profile of a user associated with the at least one user event request as the location to drive past; and
   receive an advertisement associated with the location to drive past along the unique route tailored to the user as based on the pre-uploaded social media picture in the social media profile of the user and based on a proximity of the location to drive past to the autonomous vehicle along the unique route that is based on the pre-uploaded social media picture in the social media profile of the user.

2. The routing system of claim 1, wherein the destination is set to return to the starting location.

3. The routing system of claim 1, wherein the destination is set to a location different from the starting location.

4. The routing system of claim 1, wherein the machine readable instructions further cause the routing system to perform at least the following when executed by the one or more processors:
   navigate the autonomous vehicle to the starting location to pick up one or more users prior to navigation of the autonomous vehicle to the destination along the unique route.

5. The routing system of claim 1, wherein the at least one user event request is received based on at least a user profile comprising one or more preferences, and the at least one user event request comprises at least one of the one or more preferences.

6. The routing system of claim 5, wherein the user profile is associated with a single user and includes the one or more preferences for the single user.

7. The routing system of claim 5, wherein the user profile is associated with a multi-person group and includes the one or more preferences for the multi-person group.

8. The routing system of claim 5, wherein the one or more preferences of the user profile comprises a past unique route, a music preference, a food preference, a scenic route preference, personal data comprising social media profiles, or combinations thereof.

9. The routing system of claim 1, wherein the machine readable instructions further cause the routing system to perform at least the following when executed by the one or more processors:
   receive an instruction to stop at the location to modify the unique route.

10. A method for generating autonomous navigation routes, the method comprising:
    determining, via the a routing system, a starting location for vehicle navigation;
    receiving at the routing system a destination for an autonomous vehicle
    receiving at least one user event request;
    generating, via the routing system, a unique route to satisfy driving past the at least one user event request to navigate the autonomous vehicle to arrive at the destination;
    navigating the autonomous vehicle via the routing system to the destination along the unique route tailored to meet the at least one user event request, wherein the at least one user event request comprises a location based on a pre-uploaded social media picture in a social media profile of a user associated with the at least one user event request as the location to drive past; and receiving an advertisement associated with the location to drive past along the unique route tailored to the user as based on the pre-uploaded social media picture in the social media profile of the user and based on a proximity of the location to drive past to the autonomous vehicle along the unique route that is based on the pre-uploaded social media picture in the social media profile of the user.

11. The method of claim 10, wherein the destination is set to return to the starting location.

12. The method of claim 10, wherein the destination is set to a location different from the starting location.

13. The method of claim 10, further comprising navigating the autonomous vehicle to the starting location to pick up one or more users prior to navigation of the autonomous vehicle to the destination along the unique route.

14. The method of claim 10, wherein the at least one user event request is received based on at least a user profile comprising one or more preferences, and the at least one user event request comprises at least one of the one or more preferences.

15. The method of claim 14, wherein the user profile is associated with a single user and includes the one or more preferences for the single user.

16. The method of claim 14, wherein the user profile is associated with a multi-person group and includes the one or more preferences for the multi-person group.

17. The method of claim 10, further comprising receiving an instruction to stop at the location to modify the unique route.

* * * * *